United States Patent Office 2,971,043
Patented Feb. 7, 1961

2,971,043

METHOD OF MAKING STORAGE BATTERIES

Don G. Townsend, Anderson, Ind., assignor to General Motors Corporation, Detroit, Mich., a corporation of Delaware No Drawing. Filed July 25, 1958, Ser. No. 750,879

3 Claims. (Cl. 136—33)

This invention relates to storage batteries and is particularly concerned with a method for accomplishing an accelerated cure of positive plates of the pasted type as used in storage batteries. In Hindall Patent 2,481,218, a method for curing positive plates of the pasted type for use in storage batteries is disclosed. This method, while producing satisfactory plates, requires long periods of time and relatively expensive apparatus. In Hindall Patent 2,656,399, another method for curing positive plates is disclosed which reduces the time required and which produces a well-cured plate.

The present invention is directed to still another method for accomplishing curing of positive battery plates by accelerated methods wherein the plate may be fully cured in a fraction of the time required by any prior known method.

It is, therefore, an object of this invention to provide an accelerated cure for positive battery plates wherein the plates are subjected to a pressurized steam treatment followed by a cure in a carbon dioxide atmosphere containing at least 10% carbon dioxide.

Another object of the invention is to provide a curing process wherein pasted plates are autoclaved for about fifteen minutes in fifteen pounds steam maintained at 230° F. and thereafter are cured in an atmosphere containing 12½% carbon dioxide at a temperature of about 196° F. for a period of about ten minutes.

Further objects and advantages will be apparent from the description which follows.

Positive battery plates of the type cured by the present process for subsequent use in lead-acid storage batteries are made by pasting a lead or lead alloy grid with a paste made from Barton litharge (which is basically a mixture of about 37½% yellow litharge, 37½% red litharge and 25% free lead) with water and sulfuric acid and some red lead, if desired. This paste is incorporated with the grid and the plates are ready for the curing process.

During the cure, the particle size of the ingredients of the plate paste can be controlled as can be the metallic lead content wherein the control has the added feature of controlling the particle size and metallic lead content of the formed plate after it is placed in the battery. Specifically, the plates, after pasting, are autoclaved to reduce the metal content of the Barton litharge by causing oxidation of some of the free lead. At the same time, the particles of oxide are grown to a relatively large particle size. This autoclaving is accomplished in a steam chest or equivalent apparatus at 212° F. with atmospheric pressure steam although I prefer to use a positive pressure of fifteen pounds per square inch for about fifteen minutes wherein the temperature ranges in the neighborhood of 230° F.

After the plates have been so treated, they have a controlled particle size and, similarly, they have a reduced metallic lead content. The plate is now ready for curing which is carried out in an atmosphere containing carbon dioxide to form lead carbonate dispersed throughout the plate paste which yields a strong and stable structure. In this connection, I believe the salt formed is basic lead carbonate wherein the percent conversion should exceed 25%. I have found that the carbon dioxide content in the atomsphere must be at least 10% in order to get a thorough carbonate dispersion in the plate paste. By increasing the carbon dioxide content, it is possible to shorten the curing time and, by heating the plate during its exposure to the carbon dioxide, it is possible to shorten the cure and remove moisture from the plate. Specifically, I prefer to dry the plate during its exposure to carbon dioxide at a temperature of 196° F. wherein a 12½% carbon dioxide content is present in the atmosphere. With these controls, a period of ten minutes is required for a complete cure whereupon the plate is also completely dried. It is understood that carbon dioxide content in the curing atmosphere ranging from 10% to 100% may be used although I prefer about 12½% since it yields an easily controlled process which is completed at about the time that the plate is properly dried. In this connection, excessively high temperatures during drying cause a blistering and nonunniformity in the pasted plate and I prefer to use a temperature slightly below the boiling point of water for this purpose wherein a maximum drying efficiency is obtained without deleterious results to the plate paste. It is understood, of course, that the temperature may be raised as the pressure is raised from atmospheric pressure to prevent boiling or erupting of the moisture from the plate whereby even greater acceleration may be obtained although the application of carbon dioxide to the material to cause formation of lead carbonate requires time and, for this reason, a ten minute cure is preferred at the temperatures and with the carbon dioxide percentages noted.

Carbonated plates of the character formed by this procedure form very well when incorporated in a battery to which electrolyte such as sulfuric acid is added. The lead carbonate forms a sulfate and the normal plate formation will then take place.

Plates cured by this method are more rugged and resistant to shock in the unformed state and yield, after formation, discharge rates about 5% higher than similar plates cured by other methods. For example, displacement of the active material pellets from a pasted plate cured by the best known prior art method required 324 p.s.i. while the same test run on a similar pasted plate cured by the present method required 740 p.s.i., thus showing the improved physical properties of plates cured by this method. The method may be carried out by batch procedures or by continuous methods as desired through the use of well known equipment. In general, however, the desirability of the present method revolves around the reduced time period required for curing the plate together with the increased ruggedness and improved electrical properties with which the plate is endowed.

While the embodiments of the present invention as herein disclosed constitute preferred forms, it is to be understood that other forms might be adopted.

What is claimed is as follows:

1. In a method for curing a positive plate for use in a lead-acid storage battery wherein the plate includes a paste formed from a mixture of sulfuric acid, red and yellow litharge and up to 25% free lead, the steps consisting of; subjecting a pasted plate to steam at temperatures between 212° F. and 230° F. and at a pressure sufficient to prevent boiling from said plate, for a time sufficient to control the particle size and for reducing the metallic lead content of the plate paste, said steam being substantially free from carbon dioxide, and then curing the plate at temperatures above 190° F. and below 212°

F. in an atmosphere containing carbon dioxide ranging between 10% and 100% and for a time sufficient to form a lead carbonate surface on the plate paste.

2. In a method for curing a positive plate for use in a lead-acid storage battery wherein the plate includes a paste formed from a mixture of sulfuric acid and paste forming materials consisting of about 37½% red litharge, 37½% yellow litharge and 25% free lead, the steps consisting of; subjecting a pasted plate to steam at fifteen pounds per square inch pressure and at a temperature of 230° F. for a period of about fifteen minutes and then curing the plate for about ten minutes in an atmosphere maintained at 196° F. and containing around 12½% carbon dioxide.

3. In a method for curing a positive plate for use in a lead-acid storage battery wherein the plate includes a paste formed from a mixture of sulfuric acid and litharge containing materials consisting of about 37½% red litharge, 37½% yellow litharge and 25% free lead, the steps comprising; subjecting a plate to steam maintained at from atmospheric pressure to fifteen pounds per square inch above atmospheric pressure and at temperatures of from 212° F. to 230° F. respectively for a period sufficient to control the particle size in the plate and for reducing the metallic lead content therein, said steam being substantially free of carbon dioxide, and then curing the plate in an atmosphere containing at least 10% carbon dioxide and at a temperature of 196° F. and above and at pressures sufficient to prevent boiling of water within the plate for a time sufficient to carbonate the plate paste.

References Cited in the file of this patent
UNITED STATES PATENTS

| | | |
|---|---|---|
| 2,149,812 | Lindstrom | Mar. 7, 1939 |
| 2,553,192 | Hindall | May 15, 1951 |
| 2,656,399 | Hindall et al. | Oct. 20, 1953 |